July 7, 1970   R. D. JOHNSON ET AL   3,518,717
RIGID TURKEY SHACKLE AND POSITIONING DEVICE
Filed June 13, 1968   2 Sheets-Sheet 1

FIG. I

R. D. JOHNSON,
R. E. WALTERS, &
J. A. HAMANN
INVENTORS

BY R. Hoffman & W. Takacs
ATTORNEYS

R. D. JOHNSON,
R. E. WALTERS, &
J. A. HAMANN
INVENTORS

BY R. Hoffman & W. Takacs
ATTORNEYS

United States Patent Office 3,518,717
Patented July 7, 1970

3,518,717
RIGID TURKEY SHACKLE AND POSITIONING DEVICE
Ralph D. Johnson, Shawnee Mission, Kans., Roger E. Walters, St. Louis, Mo., and John A. Hamann, Cheverly, Md., assignors to the United States of America as represented by the Secretary of Agriculture
Filed June 13, 1968, Ser. No. 736,793
Int. Cl. A22c 21/00
U.S. Cl. 17—11                                    6 Claims

ABSTRACT OF THE DISCLOSURE

Device for use in deboning and dismembering turkey carcasses which conveys the carcasses to a work station, positions them for convenient cutting, and holds them steady so that the work may be performed quickly, efficiently, and safely.

---

A non-exclusive, irrevocable, royalty-free license in the invention herein described, throughout the world for all purposes of the U.S. Government, with the power to grant sublicenses for such purposes, is hereby granted to the Government of the United States of America.

The invention relates to and has among its objects the provision of novel apparatus for handling turkey carcasses, more particularly for conveying and positioning the carcasses and locking them in place at a selected work station so that they can be effectively processed, as by cutting or by applying other butchering operations. Further objects of the invention will be apparent from the following description taken in conjunction with the appended drawing.

In preparing turkey products such as turkey breast, boneless rolls, etc., it has been the practice to hang the carcasses on conventional poultry shackles suspended from a track which extends along the processing line. The operators are stationed along this line, and as each carcass comes to a work station the operator applies an operation which might be, for example, removal of wings, removal of legs and thigh meat, etc. The work, however, cannot be done efficiently because the carcasses are not oriented in any particular attitude nor are they held steady by the conventional shackles; they tend to sway and/or rotate so that the operator must grasp them with the one hand while applying a knife with the other. The operation is not only inefficient but also unsafe because the carcasses are generally wet and slippery so that there is the constant danger that the operator may cut the hand with which the bird is being held.

A prime object of the invention is the provision of apparatus for alleviating the problem outlined above.

Figure 1:
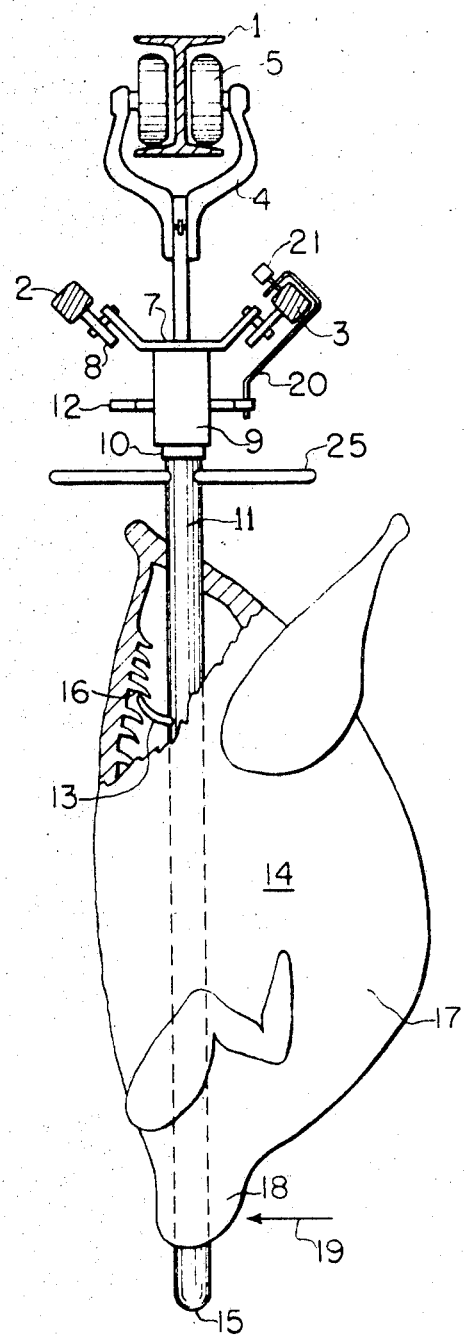
FIG. 1 is a side elevation of the device of the invention with a turkey carcass in place.
Figure 2:
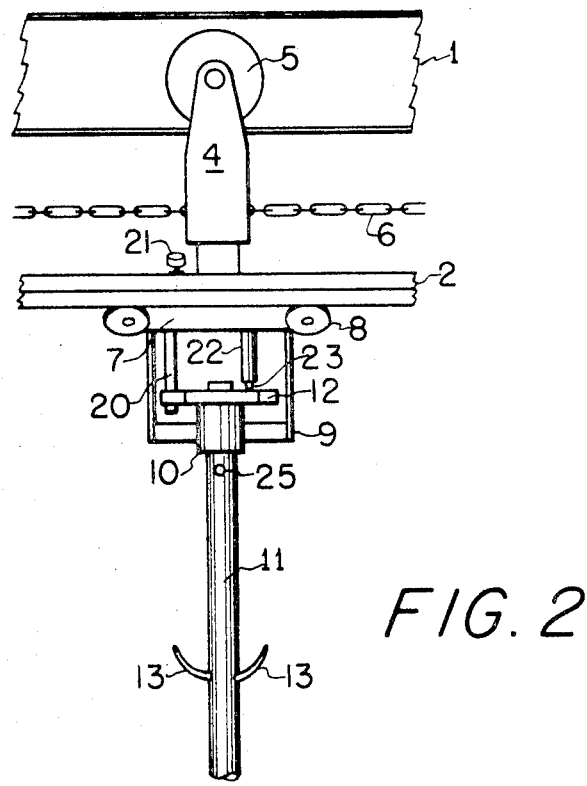
FIG. 2 is a front elevation of the device of the invention.
Figure 3:
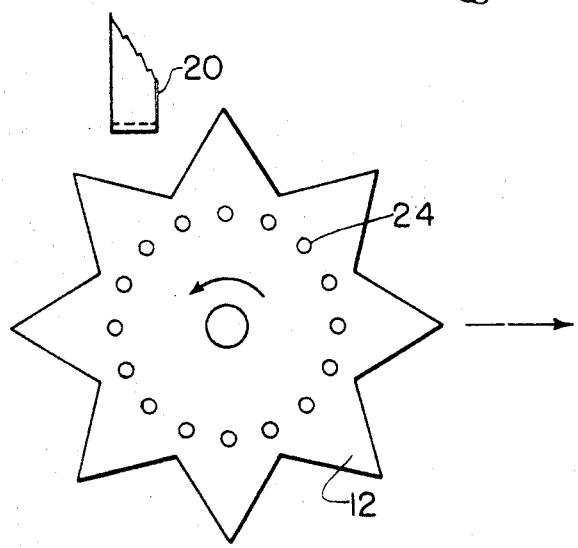
FIG. 3 is a fragmentary view, in plan and on an enlarged scale, illustrating a portion of the apparatus of the invention, particularly the star wheel.

Referring now to FIG. 1 of the appended drawing, reference numeral 1 designates a conventional I-beam track which extends along the processing line. Parallel to track 1 is a pair of stabilizing rails 2 and 3, which also run the length of the processing line.

Track 1 supports a trolley or conveyor unit 4 which is provided with rollers 5 so that it can move easily along the track. Trolley unit 4, in turn, supports the novel shackle and positioning mechanism.

A chain 6—powered by conventional means, not illustrated—is connected to trolley unit 4 whereby the shackle may be moved from station to station according to a predetermined time patern.

Fastened to trolley unit 4 is a stabilizer plate 7 equipped with rollers 8 which run on stabilizing rails 2, 3 and thereby prevent swinging motion of the shackle, both in the direction parallel to the rails and at right angles thereto.

Mounted beneath plate 7 is bearing bracket 9 to which is fastened bearing 10. Journalled within the latter is bar 11 provided with star wheel 12 keyed to said bar whereby bar 11 and star wheel 12 can rotate as a unit while supported by bearing 10.

Bar 11 is adapted for insertion through a turkey carcass which previously has been drawn and which is provided with the usual vent opening and neck (trachea) opening.

Mounted on bar 11 is a pair of backbone-engaging prongs 13. The functions of these imporatant elements of the invention are explained as follows, referring in particular to FIG. 1.

When the operator wants to utilize the device, he lifts a drawn turkey carcass 14 so that tip 15 of bar 11 enters the vent opening of the carcass and continues the lifting motion until tip 15 emerges through the neck (trachea) opening of the carcass. Then, he hitches or jiggles the bird so that prongs 13 engage the backbone structure 16 just rearwardly of the kidneys. Thereby the carcass is held securely on bar 11. Also contributing to the secure grip is the fact that the weight of the bird is concentrated at about the area indicated by reference numeral 17, and thereby there is developed a rotational moment in a clockwise direction with the points of engagement of prongs 13 as the fulcrum. The result is that the flesh about the neck opening—the area designated by numeral 18 in FIG. 1—presses strongly against bar 11 in the direction indicated by arrow 19 and so cooperates in holding the carcass securely.

An important facet of the invention is that turkey carcasses are held securely even though bar 11 and prongs 13 are of very simple construction and completely free from moving parts. This type of construction, of course, has the great advantage that is can be easily cleaned to keep it in a sanitary condition as required in food processing plants. Another important item is that the entire exterior of the carcass is available for cutting operations; there is no interference by external apparatus such as the leg- or wing-engaging clamps used on conventional poultry shackles. A further significant feature of the invention is that prongs 13 provide a secure grip on the carcass because of their backbone-engaging conformation, yet they are so sized that they enter readily through the vent opening. Thus, in use of the device the conventional vent opening is employed; there is no need to make additional cuts as would be required if one were to use a bulky or complicated gripping mechanism.

Automatic orientation of the turkey carcass at the work station is accomplished as follows: A camming bar 20 is mounted on rail 3 and held in place by screw 21. As the shackle is drawn to the work station by chain 6, bar 20 engages star wheel 12 whereby the bird is rotated 22.5°. As evident from the drawings, when the shackle is moved from left to right the rotation will be counterclockwise if the camming bar is on rail 3; or it will be clockwise if the camming bar is on rail 2. It is further obvious that rotation through any multiple of 22.5° may be obtained by providing several camming bars in series. For example, if the bird is to be rotated through 90° in passing from a first work station to a second work station, one would provide a series of four camming bars on either rail 2 or rail 3 (depending on the direction of rotation desired) in the interval between the two work stations. It is also obvious that the angle of rotation may be varied by adjusting the point at which camming bar 20 engages star wheel 12. For example, a greater angle of rotation is obtained by using a camming bar of such dimensions that it contacts the star wheel closer to the axis thereof.

For holding the shackle against rotary motion after it has been oriented by the camming bar, there is provided unit 22 which contains a spring-loaded ball 23 which cooperates with the corresponding pits or sockets 24 in star wheel 12. It is obvious that although this system will prevent random rotation, the effect of ball 23 is overcome when the shackle traverses along the track and camming bar 20 contacts star wheel 12.

Handle 25 is provided on bar 11 so that an operator can manually rotate a bird as desired when it is at a work station. It is obvious that the torque applied manually to handle 25 will overcome the effect of spring-loaded ball 23.

Star wheel 12 as depicted contains eight points. It is obvious that the number of points is not a critical item and may be varied as desired to secure a desired degree of rotation for each contact. Moreover, one might provide several star wheels one above the other, each containing a different number of points so that the degree of rotation by contact with a cooperating camming bar could be varied as desired for a particular pattern of work layout.

Although the device of the invention is primarily adapted for the handling of turkey carcasses, it is obvious that it can be used for other poultry including chickens, ducks, geese, etc.

Having thus described the invention, what is claimed is:

1. A device for holding a turkey carcass in a tail-up position, comprising, in combination:
    (a) a trolley provided with rollers for traversal on an overhead track,
    (b) a turkey carcass-supporting bar positioned vertically with its upper end operation connected to the trolley and its lower end hanging free, the bar being adapted to be received longitudinally within the body cavity of a turkey carcass through the vent opening, said bar being sufficiently long that when a turkey carcass is in operative position thereon the lower end of the bar protrudes through the neck opening, and
    (c) a pair of prongs mounted on the upper portion of said bar and extending radially and upwardly, said prongs being adapted for engagement with the internal backbone structure of a turkey carcass when it is in operative position on said bar for secure gripping of the carcass.

2. The device of claim 1 wherein the turkey carcass-supporting bar is rotatably connected to the trolley and wherein there is provided means responsive to traversal of the trolley for rotating the bar through a predetermined angle.

3. The device of claim 1 wherein there is included stabilizing means for restricting swaying of the turkey carcass supporting bar.

4. A device for holding a turkey carcass in a tail-up position which comprises, in combination:
    (a) a trolley provided with rollers for traversal on an overhead track,
    (b) a stabilizer plate operatively connected to the trolley, and including rollers cooperative with a pair of spaced parallel rails for minimizing swaying of the device,
    (c) a turkey carcass-supporting bar positioned vertically with its upper end rotatably connected to the stabilizer plate and its lower end hanging free, the bar being adapted to be received longitudinally within the body cavity through the vent opening, said bar being sufficiently long that when a turkey carcass is in operative position thereon the lower end of the bar protrudes through the necking opening,
    (d) a pair of prongs mounted on the upper portion of the bar and extending radially and upwardly, said prongs being adapted for engagement with the internal backbone structure of a turkey carcass when it is in operative position on said bar for secure gripping of the carcass,
    (e) a star wheel mounted on said bar, and
    (f) cam means cooperative with said star wheel to provide rotation of the bar through a predetermined angle responsive to the traversal of the device along the overhead track.

5. The device of claim 4 wherein there is provided spring-biased locking means cooperative with the star wheel for restricting random rotation of the turkey carcass-supporting bar.

6. The device of claim 4 wherein the prongs are mounted on such a portion of the bar that when a turkey is in operative position on the bar the prongs engage the backbone structure rearwardly of the kidneys whereby additional gripping effect is attained through the weight of the carcass pressing sidewise against the bar at the point where the bar passes through the neck opening of the carcass.

References Cited

UNITED STATES PATENTS

| | | | |
|---|---|---|---|
| 1,797,606 | 3/1931 | Crider | 17—11 X |
| 2,423,560 | 7/1947 | Jasper | 17—44.1 |
| 2,723,421 | 11/1955 | Smith et al. | 17—11 |
| 3,083,813 | 4/1963 | Lusher | 198—131 |

LUCIE H. LAUDENSLAGER, Primary Examiner

U.S. Cl. X.R.

198—33, 131